US009916511B2

(12) United States Patent
Tommy et al.

(10) Patent No.: US 9,916,511 B2
(45) Date of Patent: Mar. 13, 2018

(54) SYSTEMS AND METHODS FOR AUTHENTICATION BASED ON HUMAN TEETH PATTERN

(71) Applicant: Tata Consultancy Services Limited, Mumbai (IN)

(72) Inventors: Robin Tommy, Trivandrum (IN); Reshmi Ravindranathan, Trivandrum (IN); Deen Dayal Mohan, Trivandrum (IN); Hima Jose, Trivandrum (IN); Sarath Sivaprasad, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/271,971

(22) Filed: Sep. 21, 2016

(65) Prior Publication Data
US 2017/0286787 A1    Oct. 5, 2017

(30) Foreign Application Priority Data
Mar. 29, 2016  (IN) .............................. 201621010871

(51) Int. Cl.
G06K 9/00    (2006.01)
G06K 9/72    (2006.01)
G06K 9/62    (2006.01)

(52) U.S. Cl.
CPC ....... G06K 9/00885 (2013.01); G06K 9/6212 (2013.01); G06K 9/72 (2013.01); *G06K 2209/01* (2013.01)

(58) Field of Classification Search
CPC ... G06K 9/00885; G06K 9/72; G06K 2209/01
See application file for complete search history.

(56) References Cited

U.S. PATENT DOCUMENTS 8,976,160 B2    3/2015  Vilcovsky et al.
2007/0041622 A1  2/2007  Calcagno
(Continued)

FOREIGN PATENT DOCUMENTS

WO    WO 00/60533    10/2000

OTHER PUBLICATIONS

Jeon, Jong-Bae, et al. "Performance evaluation of teeth image recognition system based on difference image entropy." Convergence and Hybrid Information Technology, 2008. ICCIT'08. Third International Conference on. vol. 2. IEEE, 2008.*
(Continued)

*Primary Examiner* — Bhavesh Mehta
*Assistant Examiner* — Menatoallah Youssef
(74) *Attorney, Agent, or Firm* — Finnegan, Henderson, Farabow, Garrett & Dunner LLP

(57) ABSTRACT

An automated system and method to authenticate one or more users based on capturing one or more images of a set of teeth, obtaining a selected image from the one or more captured images and extracting a portion of the selected image to obtain an extracted image. Each extracted image is converted into a grayscale image and stored in a database along with the username and the user keyword of the one or more users. A unique signature matrix and a pattern vector is generated by processing the grayscale image and stored in the database along with the username. One or more images comprising a set of teeth of at least one user is captured and a unique signature matrix obtained from the same is compared with a set of unique signature matrices previously stored in the database and at least one action is triggered based on the comparison.

20 Claims, 8 Drawing Sheets

(56) References Cited

U.S. PATENT DOCUMENTS

2007/0183633 A1* 8/2007 Hoffmann .......... G06K 9/00221
  382/116
2012/0199653 A1 8/2012 Wenzel
2013/0219480 A1 8/2013 Bud

OTHER PUBLICATIONS

Kim, Dong-Su, and Kwang-Seok Hong. "Multimodal biometric authentication using teeth image and voice in mobile environment." IEEE Transactions on Consumer Electronics 54.4 (2008).*

Kim, Dong-Ju, Kwang-Woo Chung, and Kwang-Seok Hong. "Person authentication using face, teeth and voice modalities for mobile device security." IEEE Transactions on Consumer Electronics 56.4 (2010).*

B. Kavitha et al., "Opening the Electronic Mail is using Retina", Int. J. Computer Technology & Applications, John Wiley & Sons Ltd, vol. 5 (5), pp. 1741-1744, 2014.

* cited by examiner

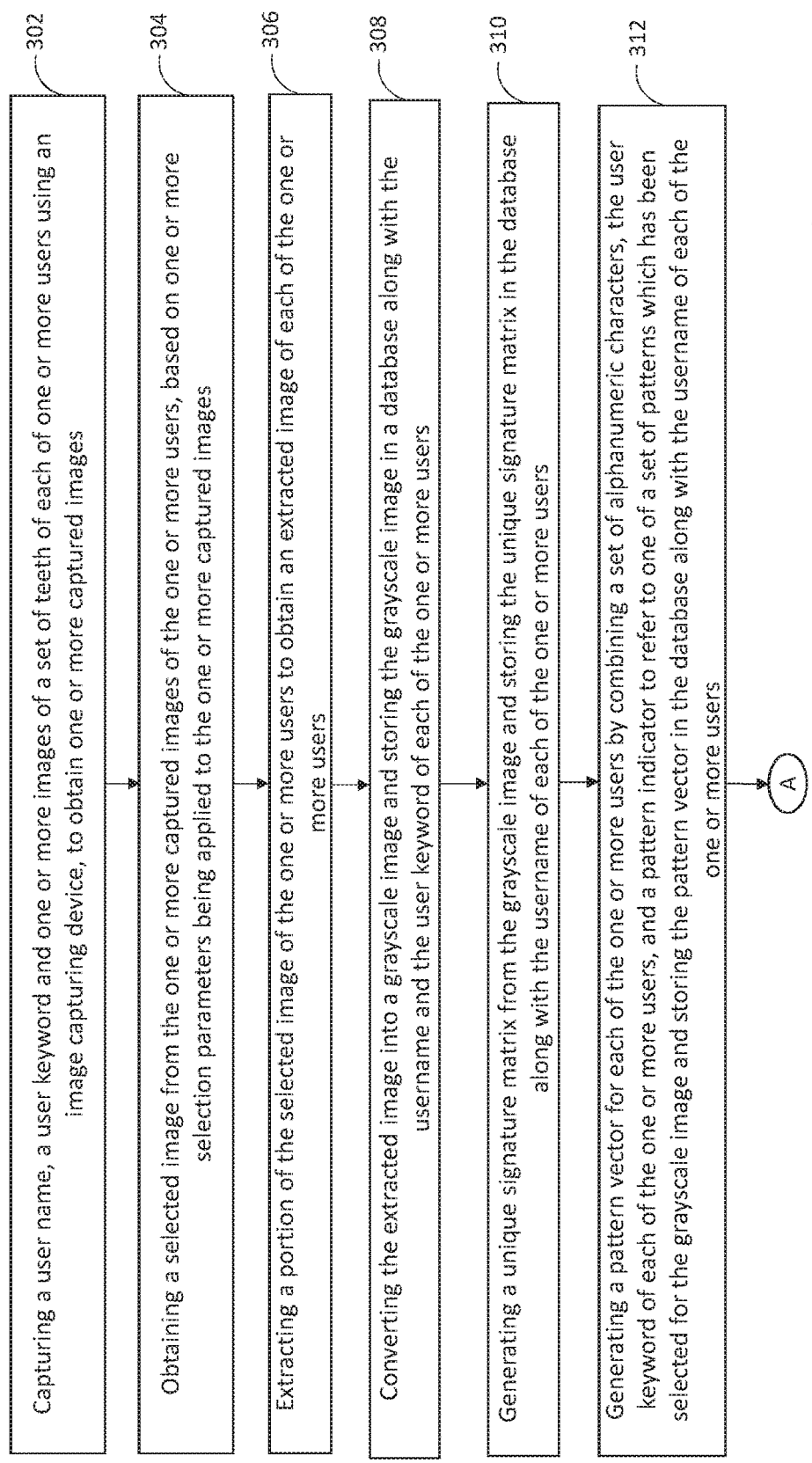

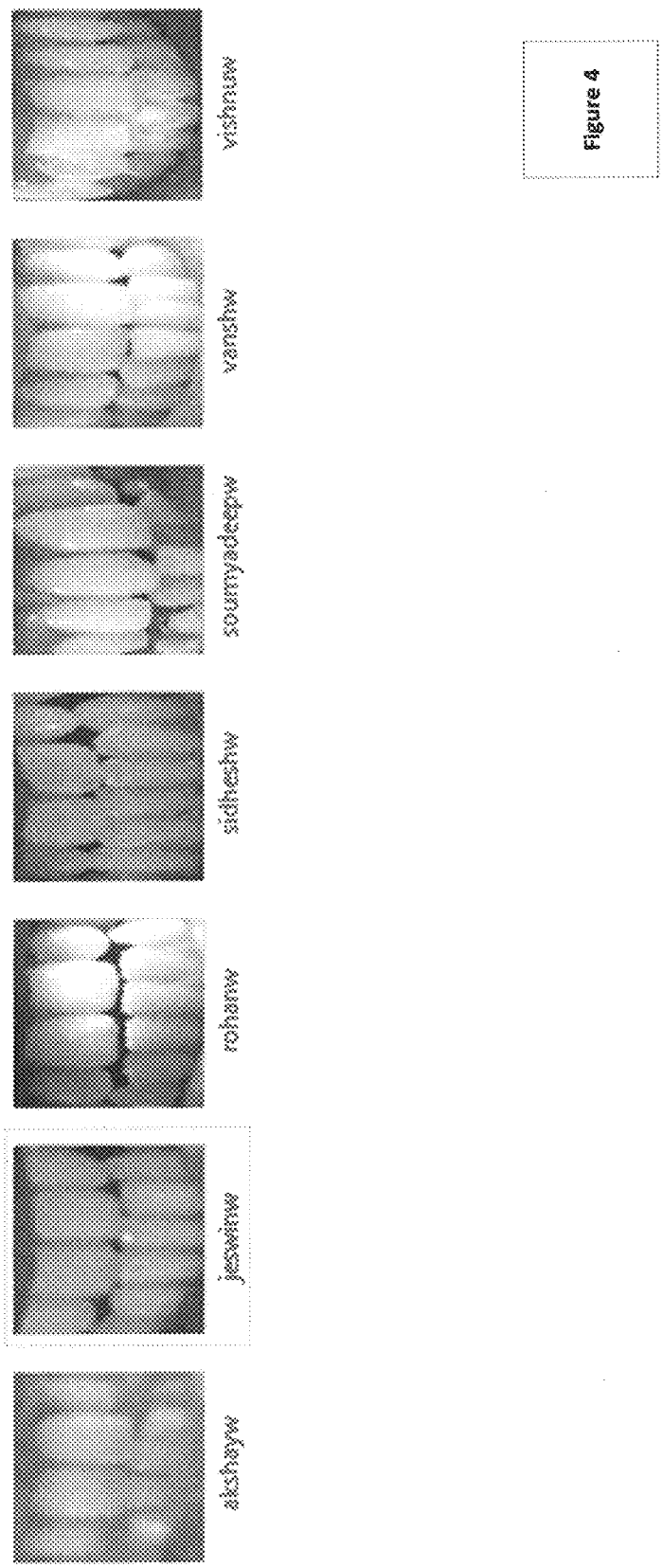

ered detailed description that is presented
SYSTEMS AND METHODS FOR AUTHENTICATION BASED ON HUMAN TEETH PATTERN

PRIORITY CLAIM

This U.S. patent application claims priority under 35 U.S.C. § 119 to: India Application No. 201621010871, filed on Mar. 29, 2016. The entire contents of the aforementioned application are incorporated herein by reference.

TECHNICAL FIELD

The embodiments herein generally relate to authentication systems, and more particularly, to systems and methods for authenticating humans based on their teeth pattern.

BACKGROUND

Authentication techniques are typically employed to enable reliable and accurate determination of the correct identity of a person to allow him or her to carry out specific transactions, either for themselves or on behalf of another person. Some of the known authentication techniques are based on use of passwords, encryption, digital signatures, virtual keyboards, biometric scans and the like. Specifically, biometric authentication, as it applies to humans, depends on analysis of a person's measurable biological characteristics such as iris, DNA, face, voice, fingerprint, retina, signature and the like to authenticate the person.

It is often seen that these biometric authentication techniques include the use of heavy and complex algorithms and also involve substantial image processing and hence are resource intensive and costly. Some of these techniques may also involve bringing down the system for huge data processing and related validation. Also, because these techniques need to store the biometric scans for further analysis and matching, these techniques lead to privacy concerns in many countries. It is important therefore to come up with an efficient and cost-effective biometric authentication technique that can accurately authenticate the person as well as overcome the above disadvantages.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a processor implemented method. The method comprising: (a) capturing a user name, a user keyword and one or more images of a set of teeth of each of one or more users using an image capturing device, to obtain one or more captured images, (b) obtaining a selected image from the one or more captured images of the one or more users, based on one or more selection parameters being applied to the one or more captured images, (c) extracting a portion of the selected image of the one or more users to obtain an extracted image of each of the one or more users, (d) converting the extracted image into a grayscale image and storing the grayscale image in a database along with the username and the user keyword of each of the one or more users, (e) generating a unique signature matrix from the grayscale image and storing the unique signature matrix in the database along with the username of each of the one or more users, (f) generating a pattern vector for each of the one or more users by combining a set of alphanumeric characters, the user keyword of each of the one or more users, and a pattern indicator to refer to one of a set of patterns which has been selected for the grayscale image and storing the pattern vector in the database along with the username of each of the one or more users, (g) obtaining one or more images comprising a set of teeth of at least one user using an image capturing device, to obtain one or more captured images of the at least one user and repeating the steps (b) to (e) to obtain a unique signature matrix for the at least one user, (h) performing a comparison between the unique signature matrix with a set of unique signature matrices previously stored in the database, and (i) triggering at least one action based on the comparison.

In an aspect, a processor implemented system provided. The processor implemented system comprises a memory storing instructions and a database, and a hardware processor coupled to the memory, wherein the hardware processor is configured by the instructions to (a) capture a user name, a user keyword and one or more images of a set of teeth of each of one or more users using an image capturing device, to obtain one or more captured images, (b) obtain a selected image from the one or more captured images of the one or more users, based on one or more selection parameters being applied to the one or more captured images, (c) extract a portion of the selected image of the one or more users to obtain an extracted image of each of the one or more users, (d) convert the extracted image into a grayscale image and storing the grayscale image in a database along with the username and the user keyword of each of the one or more users, (e) generate a unique signature matrix from the grayscale image and store the unique signature matrix in the database along with the username of each of the one or more users, (f) generate a pattern vector for each of the one or more users by combining a set of alphanumeric characters, the user keyword of each of the one or more users, and a pattern indicator to refer to one of a set of patterns which has been selected for the grayscale image and store the pattern vector in the database along with the username of each of the one or more users, (g) obtain one or more images comprising a set of teeth of at least one user using an image capturing device, to obtain one or more captured images of the at least one user and repeating the steps (b) to (e) to obtain a unique signature matrix for the at least one user, (h) perform a comparison between the unique signature matrix with a set of unique signature matrices previously stored in the database, and (i) trigger at least one action based on the comparison.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 3A through FIG. 3B is a flow diagram illustrating a processor implemented method of authenticating the one or more users based on their teeth pattern as required by the one or more users of FIG. 1 using the system for authenticating the one or more users based on their teeth pattern according to an embodiment of the present disclosure.

FIG. 4 depicts an extracted image of each of the one or more users, according to an embodiment of the present disclosure.

DETAILED DESCRIPTION

Figure 1:
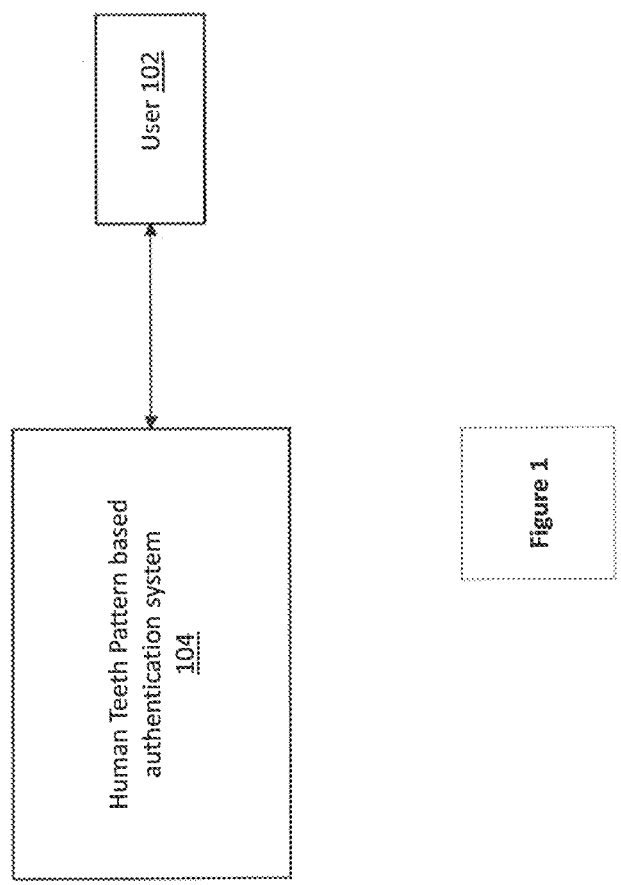
FIG. 1 illustrates one or more users interacting with a system for authenticating the one or more users based on their teeth pattern according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Similarly, the words "person", "individual", "human", "user" and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates a user 102 interacting with a human teeth pattern based authentication system 104 for authenticating one or more users based on their teeth pattern according to an embodiment of the present disclosure. The expressions "human teeth pattern based authentication system" and "system" may be interchangeably used herein.

Figure 2:
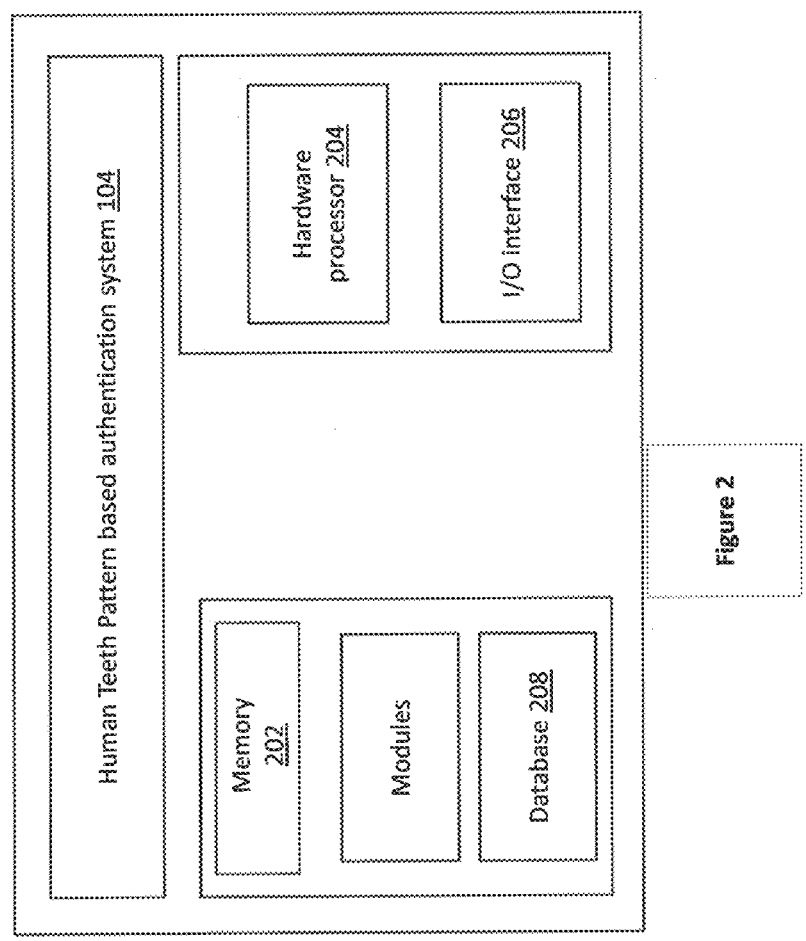
FIG. 2 illustrates a block diagram of the system for authenticating the one or more users based on their teeth pattern according to an embodiment of the present disclosure.

FIG. 2, with reference to FIG. 1, illustrates a block diagram of the system 104 for authenticating one or more users based on their teeth pattern according to an embodiment of the present disclosure. The system 104 comprises a memory 202 and a hardware processor 204. The memory 202 further includes one or more modules. The memory 202 and the hardware processor 204, and/or the modules may be coupled by a system bus or a similar mechanism, for example, an I/O interface 206.

The memory 202, may store instructions, any number of pieces of information, and data, used by a computer system, for example the system 104 to implement the functions of the system 104. The memory 202 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 202 may be configured to store information, data, applications, instructions or the like for enabling the system 104 to carry out various functions in accordance with various example embodiments.

Additionally or alternatively, the memory 202 may be configured to store instructions which when executed by the hardware processor 204 causes the system 104 to behave in a manner as described in various embodiments (e.g. capturing a user name, a user keyword and one or more images of a set of teeth of each of one or more users to obtain one or more captured images, obtaining a selected image from the one or more captured images based on one or more selection parameters, extracting a portion of the selected image to obtain an extracted image, converting the extracted image into a grayscale image and storing the grayscale image in a database 208 along with the username and the user keyword, generating a unique signature matrix from the grayscale image of the one or more users and storing the unique signature matrix in the database 208 along with the username, generating a pattern vector of each of the one or more and storing the pattern vector in the database along with the username, obtaining one or more images comprising a set of teeth of at least one user, to obtain one or more captured images of the at least one user and repeating the steps to obtain a unique signature matrix, performing a comparison between the unique signature matrix with a set of unique signature matrices previously stored in the database). Additionally, the memory 202 stores a database 208.

The hardware processor 204 may be implemented as one or more microprocessors, microcomputers, microcontrollers, digital signal processors, central processing units, state machines, logic circuitries, and/or any devices that manipulate signals based on operational instructions. Further, the hardware processor 204 may comprise a multi-core architecture. Among other capabilities, the hardware processor 204 is configured to fetch and execute computer-readable instructions or modules stored in the memory 202. The hardware processor 204 may include circuitry implementing, among others, audio and logic functions associated with the communication. For example, the hardware processor 204 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 204 thus may also include the functionality to encode messages and/or data or information. The hardware processor 204 may include, among other things, a clock, an arithmetic logic unit (ALU) and logic gates configured to support operation of the hardware processor 204. Further, the hardware processor 204 may include functionality to execute one or more software programs, which may be stored in the memory 202 or otherwise accessible to the hardware processor 204.

The hardware processor 204 is configured by the instructions stored in the memory 202. The hardware processor 204 when configured by the instructions, captures a user name, a user keyword and one or more images of a set of teeth of each of one or more users using an image capturing device to obtain one or more captured images. In an embodiment, for each user one or more images may be captured that depict a set of teeth. In an embodiment, the one or more captured images of the one or more users depict the structural features of a set of teeth including width, inclination, gaps among the set of teeth. In an embodiment, the one or more users include, but are not limited to, users who register their user credentials for carrying out different types of transactions, for example, banking transactions, retail transactions and so on and may be required to be authenticated using their teeth pattern. The hardware processor 204, then selects at least one image from the one or more captured images, based on one or more selection parameters. In an embodiment, the one or more selection parameters include, but are not be limited to, intensity, brightness, blur and other similar parameters. The hardware processor 204 then extracts a portion of the selected image pertaining to each user to obtain an extracted image for each user. In an embodiment, the hardware processor 204 extracts the portion of the selected image using a technique referred to as Pavlidis technique. The extracted image of each user includes a portion depicting an anterior upper and lower set of teeth. In an embodiment, the extracted image specifically includes the anterior upper and lower four teeth for further analysis and processing. FIG. 4 depicts an illustrative example of an extracted image of each of the one or more users, based on which the embodiments of the present disclosure have been tested.

Figure 5:
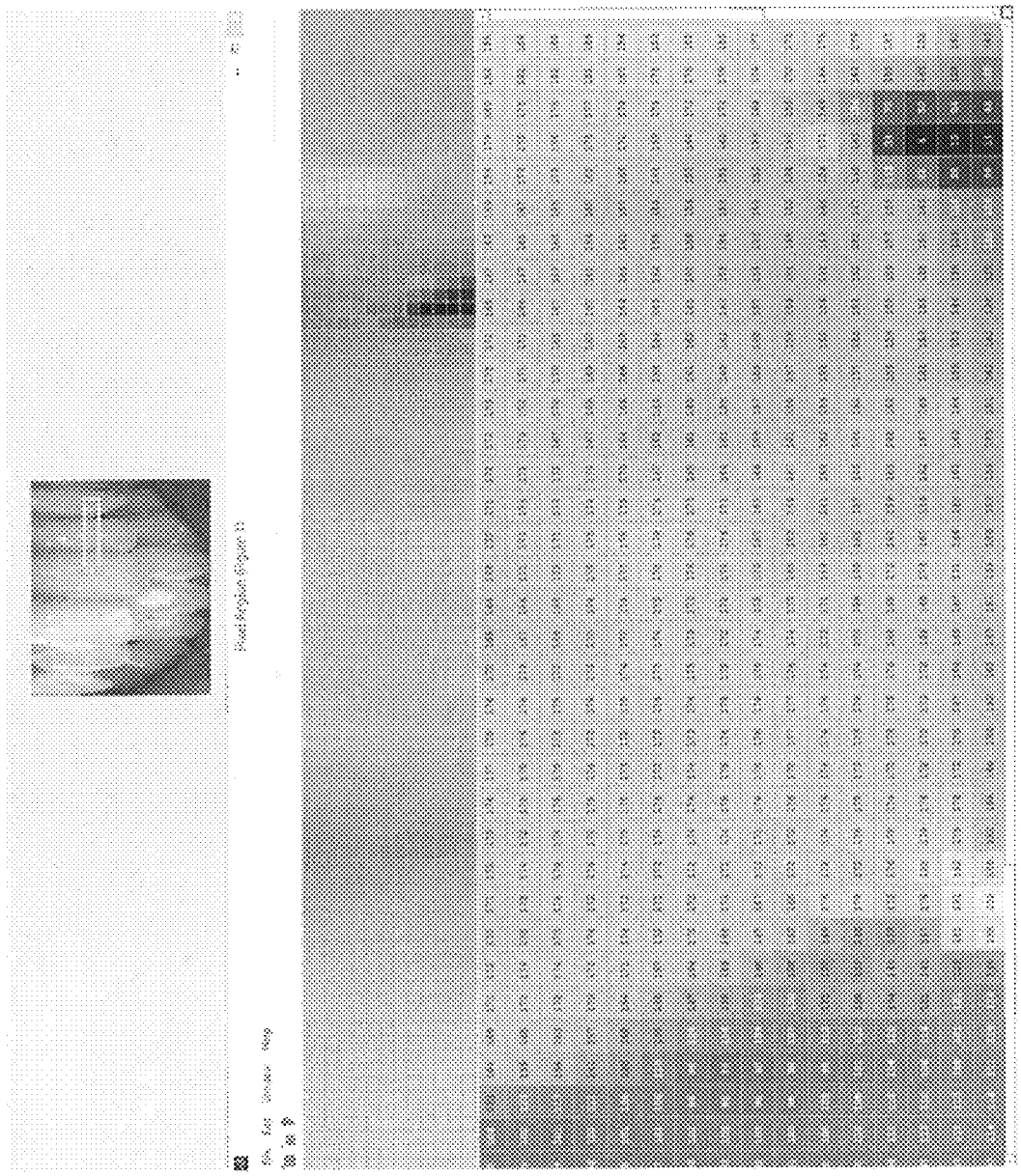
FIG. 5 depicts a grayscale image of an user, stored as a two dimensional matrix of pixels and a close-up view of the grayscale image of the user to depict the individual pixel cells with their corresponding intensities, according to an embodiment of the present disclosure.

Each extracted image may comprise a Red, Blue, Green format (referred to as RGB format). The hardware processor 204 then converts the extracted image into a grayscale image. In an embodiment, the grayscale image of each of the one or more users is a 256*256 pixel array saved in *.tif format. Considering the extracted image of one person indicated as jeswinw in FIG. 4, the extracted image of the person is converted into grayscale format using the luminosity formula Im=(0.21*R+0.71*G+0.07*B) where Im is the output image in grayscale format and the universal constants 0.21, 0.71 and 0.07 have been used for conversion of the extracted image to a grayscale image. Using this formula, the extracted image of the person was converted by the hardware processor 204 into a grayscale image as shown in FIG. 5. FIG. 5 depicts the grayscale image of a user and is stored as a two dimensional matrix of pixels and a close-up view of the grayscale image of the user to depict the individual pixel cells with their corresponding intensities. There may be instances, where the images are captured in black and white format or grayscale format. In such scenarios, the conversion of extracted images into grayscale image may not be performed.

The hardware processor 204 then generates a unique signature matrix for each user from the grayscale image of each and stores the unique signature matrix in the database along with corresponding username of each user. In an embodiment, the unique signature matrix of each of said one or more users is generated from the grayscale image by applying zigzag Discrete Cosine Transform technique. For the grayscale image depicted in FIG. 5, the hardware processor 204 generated a sample portion of the unique signature matrix as shown in Table 1 below.

TABLE 1

| | | | | | | | | | |
|---|---|---|---|---|---|---|---|---|---|
| −0.0082 | 0.1003 | −0.0311 | 0.829 | 1.312 | 0.823 | 1.237 | 0.90 | 1.032 | 0.321 |

The hardware processor 204 then generates a pattern vector for each user from the grayscale image of each user. To generate the pattern vector, the hardware processor 204 draws a set of patterns on the grayscale image of each user, wherein each of the set of patterns comprises region of interest from at least one of an upper left incisor, an upper right incisor, a lower left incisor, and a lower right incisor. In an embodiment, the set of patterns includes (i) starting from upper left incisor horizontally towards upper right incisor, then slanting towards the lower left incisor and then horizontally towards lower right incisor, (ii) starting from lower left incisor horizontally towards lower right incisor, then slanting towards the upper left incisor and then horizontally towards upper right incisor, (iii) starting from lower right incisor horizontally towards lower left incisor, then slanting towards the upper right incisor and then horizontally towards upper left incisor, (iv) starting from upper right incisor horizontally towards upper left incisor, then slanting towards the lower right incisor and then horizontally towards lower left incisor. For the grayscale image shown in FIG. 5, the hardware processor 204 generated one or more patterns (e.g., four patterns) on the grayscale image as shown in FIG. 6.

The hardware processor 204 then selects one of the set of patterns of each of the grayscale image as a selected pattern for generating the pattern vector for each user. The hardware processor 204 then assigns a pattern indicator as 00, 01, 10 or 11 corresponding to the selected pattern for the grayscale image of each of the one or more and also generates an array containing intensities of a set of pixels belonging to the selected pattern. During the parsing process, each of the intensities of a set of pixels is compared to a predefined lower threshold value, referred to as D (dark) and a predefined higher threshold value, referred to as L (light) to generate a combination of alphanumeric characters. In an embodiment, the pattern vector of each user includes the combination of alphanumeric characters thus generated, followed by the user keyword previously entered by each of the one or more users, followed by the pattern indicator corresponding to the selected pattern of the grayscale image of each of the one or more users.

Figure 6:
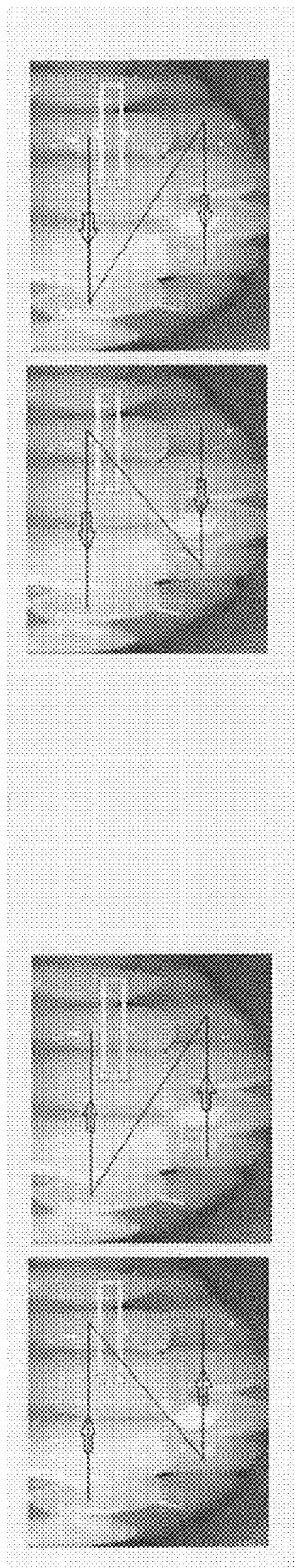
FIG. 6 depicts a set of patterns drawn on the grayscale image of the user to obtain a selected pattern for the user, according to an embodiment of the present disclosure.

Referring to FIG. 6, the hardware processor 204 randomly selected one of the four patterns drawn on the grayscale image to obtain a selected pattern for the user and parsed a set of intensities corresponding to a set of pixels belonging to the selected pattern to generate a set of alphanumeric characters, appended the user keyword to the set of alphanumeric characters and further appended the pattern indicator to the user keyword to generate a sample portion of the pattern vector for the grayscale image as shown in Table 2 below. The pixel intensities corresponding to selected pattern, stored in an array of integer values between 0 and 255, was parsed by the hardware processor 204. As the hardware processor 204 came across a set of values below a predefined threshold value (corresponding to a dark region within the grayscale image), it was encoded as D, followed by a pixel intensity value of 202, thus generating the first alphanumeric character as D202. The hardware processor 204 continued to parse the pixel intensities to generate the rest of the set of alphanumeric characters, then appended the user keyword JES@19993 to the set of alphanumeric characters and further appended a pattern indicator 10 for the selected pattern of the grayscale image of the person.

TABLE 2

| D202 | 234 | L134 | 63 | 168 | L20 | 187 | L56 | 123 | L18 | J | E | S | @ | 1 | 9 | 9 | 3 | 1 | 0 |

Figure 7:
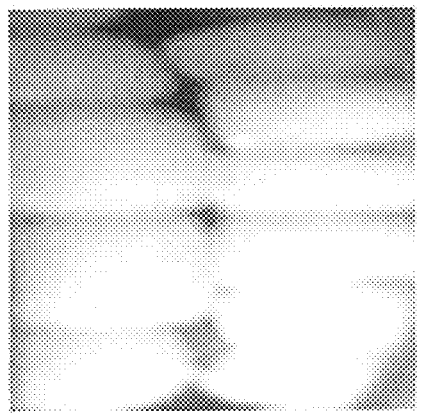
FIG. 7 depicts the grayscale image of the user captured by the system for the purpose of authenticating the user, according to an embodiment of the present disclosure.

The hardware processor 204 then obtains one or more images of a set of teeth at least one user using an image capturing device, to obtain one or more captured images and repeats the steps of converting (optionally) to obtain a unique signature matrix for the at least one user. FIG. 7 shows one such image of a user which has been captured by the hardware processor 204 for the purpose of authentication. The hardware processor 204 performs a comparison of the unique signature matrix of the user with a set of unique signature matrices previously stored in the database and triggers at least one action based on the comparison. In an embodiment, the comparison includes processing of unique signature matrix of the user using a combination of one or more weak classifiers and a meta technique to indicate whether the unique signature matrix matches at least one unique signature matrix from the set of unique signature matrix previously stored in the database to confirm an authentication of the user. In an embodiment, the triggering at least one action based on the comparison comprises denying authentication when (i) the unique signature matrix of the at least one user does not match with at least one unique signature matrix from the set of unique signature matrices stored in the database and (ii) the user keyword of the at least one does not match the previously stored user keywords in the database. In an embodiment, the triggering at least one action based on the comparison comprises performing another action when (i) the unique signature matrix of the at least one user (or users) does not match with at least one corresponding unique signature matrix from the set of unique signature matrices stored in the database and (ii) the user keyword from the one or more users matches the previously stored user keywords in the database. In an embodiment, performing another action further comprises retrieving an image from the database based on the user keyword and the pattern indicator in the database and generating a pattern vector for the image, performing a comparison between the pattern vector of the one or more users and one or more pattern vectors previously stored in the database, and authenticating the at least one user when the comparison yields a match greater than a predefined threshold value.

Figure 3B:
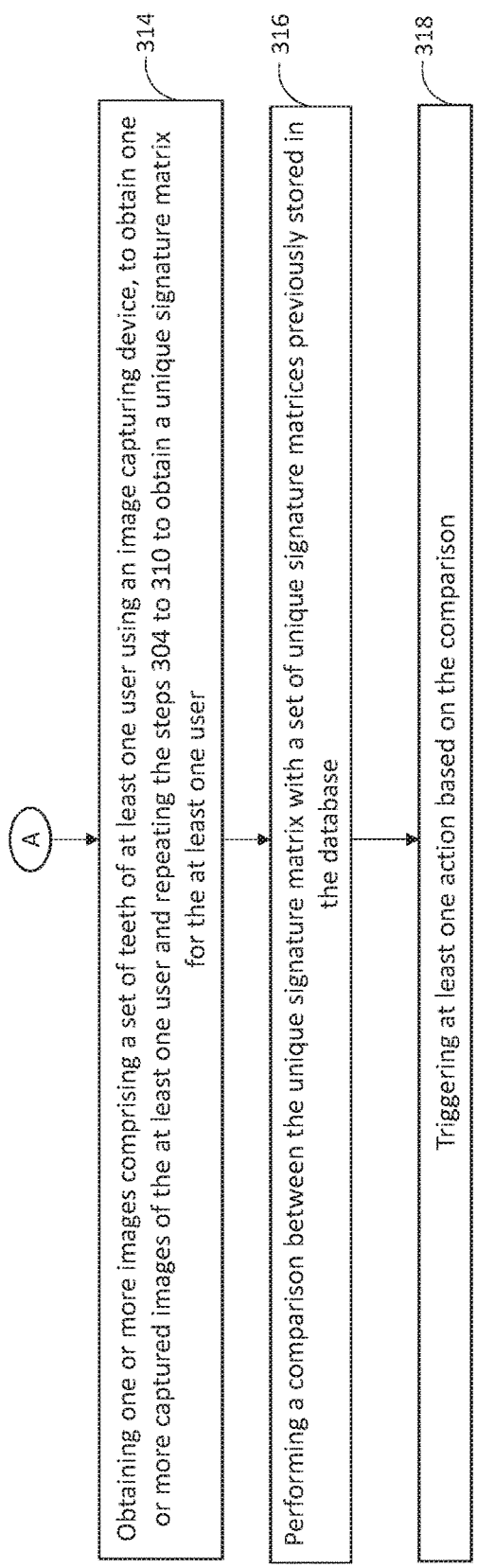

FIG. 3A through FIG. 3B, with reference to FIGS. 1-2, is a flow diagram illustrating a processor implemented method for authenticating one or more users using the system 104 according to an embodiment of the present disclosure. In step 302, a user name, a user keyword, and one or more images of a set of teeth of each of one or more users are captured using an image capturing device, to obtain one or more captured images. In step 304, a selected image is obtained from the one or more captured images of the one or more users, based on one or more selection parameters being applied to the one or more captured images. In step 306, a portion of the selected image of the one or more users is extracted to obtain an extracted image of each of the one or more users. In step 308, the extracted image is converted into a grayscale image and the grayscale image is stored in a database 208 along with the username and the user keyword of each of the one or more users. In an embodiment, the database 208 may be residing in the memory 202. In step 310, a unique signature matrix is generated from the grayscale image and the unique signature matrix is stored in the database 208 along with the username of each of the one or more users. In step 312, a pattern vector for each of the one or more users is generated by combining a set of alphanumeric characters, the user keyword of each of the one or more users and a pattern indicator to refer to one of a set of patterns which has been selected for the grayscale image and storing the pattern vector in the database 208 along with the username of each of the one or more users. In step 314, one or ore images comprising a set of teeth of at least one user is obtained using an image capturing device, to obtain one or more captured images of the at least one user and repeating the steps 304 to 310 to obtain a unique signature matrix for the at least one user. In step 316, a comparison is performed between the unique signature matrix with a set of unique signature matrices previously stored in the database 208.

The embodiments of the present disclosure and the system 104 may be implemented in, for example, but are not limited to, computing systems (e.g., mobile communication devices, smart phones, smart watches, smart display devices, personal computers (PC), laptops, palmtops, tablet PCs, servers, and so on), doors and safety lockers in financial institutions, private and government organizations, schools, colleges, universities, shops (e.g., retail outlet, jewelry stores and so on), residences (e.g., safety lockers, treasury, doors), vending machines/apparatuses, dispensing apparatuses, website(s)/webpage(s) login or authentication, and other locations/devices where a user is required to login (or feed security codes) into a system for authentication and authorization to access information (any data or any material that is treated as confidential, internal, restricted, private, personal, and so on). The system 104 carries out a set of method steps systematically, processing the images of a set of teeth of one or more users by obtaining a selected image from one or more captured images, converting the selected image into a grayscale image, generating a pattern vector and an unique signature matrix of each one or more users and using the same to authenticate the one or more users during a second login. As the embodiments reveal, the system and method of authentication based on human teeth pattern analyzes the input data elements intelligently to provide accurate authentication results, in an efficient, agile and effective way. The techniques implemented by the embodiments of the present disclosure ensure that the system 104 and method process the input data on a one set of teeth basis at a time, in a dynamic mode and the system does not need to be brought down for data processing and output. Also, to ensure privacy aspects related to one or more users, the input data of the one or more users is not stored in the system beyond the time required to process the input data.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), BLU-RAY, and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Users having ordinary skill in the art and technology to which this application pertains will appreciate that alterations and changes in the described structures and methods of operation can be practiced without meaningfully departing from the principle, spirit and scope.

What is claimed is:

1. A processor implemented method comprising:
   (a) capturing, by a hardware processor, a user name, a user keyword and one or more images of a set of teeth of each of one or more users using an image capturing device, to obtain one or more captured images;
   (b) obtaining, by said hardware processor, a selected image from said one or more captured images of said one or more users, based on one or more selection parameters being applied to said one or more captured images;

(c) extracting, by said hardware processor, a portion of said selected image of said one or more users to obtain an extracted image of each of said one or more users;

(d) converting, by said hardware processor, said extracted image into a grayscale image and storing said grayscale image in a database along with said username and said user keyword of each of said one or more users;

(e) generating, by said hardware processor, a unique signature matrix from said grayscale image and storing said unique signature matrix in said database along with said username of each of said one or more users;

(f) generating, by said hardware processor, a pattern vector for each of said one or more users by combining a set of alphanumeric characters, said user keyword of each of said one or more users, and a pattern indicator to refer to one of a set of patterns which has been selected for said grayscale image and storing said pattern vector in said database along with said username of each of said one or more users;

(g) obtaining, by said hardware processor, one or more images comprising a set of teeth of at least one user using an image capturing device, to obtain one or more captured images of said at least one user and repeating the steps (b) to (e) to obtain a unique signature matrix for said at least one user;

(h) performing a comparison between said unique signature matrix with a set of unique signature matrices previously stored in said database; and (i) triggering at least one action based on said comparison.

2. The method of claim 1, wherein said one or more selection parameters comprises at least one of intensity, brightness and blur pertaining to said one or more captured images.

3. The method of claim 1, wherein said extracted image comprises at least a portion depicting an anterior upper and a lower set of teeth.

4. The method of claim 1, wherein said set of patterns drawn on said grayscale image comprises region of interest from at least one of an upper left incisor, an upper right incisor, a lower left incisor, and a lower right incisor.

5. The method of claim 1, wherein said unique signature matrix for each person is generated from said grayscale image using applying zigzag Discrete Cosine Transform technique.

6. The method of claim 1, wherein said comparison comprises processing of said unique signature matrix of each of said one or more users using at least one of one or more weak classifiers and a meta technique to indicate whether said unique signature matrix matches at least one corresponding unique signature matrix previously stored in said database to confirm an authentication of said at least one user.

7. The method of claim 1, wherein said triggering said at least one action based on said comparison comprises denying authentication when (i) said unique signature matrix does not match with at least one of said unique signature matrices previously stored in said database, and (ii) said user keyword users does not match with at least one user keyword previously stored in said database.

8. The method of claim 1, wherein the step of triggering at least one action based on said comparison comprises performing another action when said unique signature matrix does not match with at least one unique signature matrix from said set of unique signature matrices previously stored in said database, and (ii) said user keyword matches with at least one user keyword previously stored in said database.

9. The method of claim 8, wherein said another action comprises:

retrieving an image from said database based on said user keyword and said pattern indicator in said database and generating a pattern vector for said image, performing a comparison between said pattern vector of said one or more users and one or more pattern vectors previously stored in said database, and authenticating said at least one user when said comparison yields a match greater than a predefined threshold value.

10. A system comprising:

a memory storing instructions and a database; and a hardware processor coupled to said memory, wherein said hardware processor is configured by said instructions to:

(a) capture a user name, a user keyword and one or more images of a set of teeth of each of one or more users using an image capturing device, to obtain one or more captured images, (b) obtain a selected image from said one or more captured images of said one or more users, based on one or more selection parameters being applied to said one or more captured images, (c) extract a portion of said selected image of said one or more users to obtain an extracted image of each of said one or more users, (d) convert said extracted image into a grayscale image and storing said grayscale image in a database along with said username and said user keyword of each of said one or more users, (e) generate a unique signature matrix from said grayscale image and store said unique signature matrix in said database along with said username of each of said one or more users, (f) generate a pattern vector for each of said one or more users by combining a set of alphanumeric characters, said user keyword of each of said one or more users, and a pattern indicator to refer to one of a set of patterns which has been selected for said grayscale image and store said pattern vector in said database along with said username of each of said one or more users, (g) obtain one or more images comprising a set of teeth of at least one user using an image capturing device, to obtain one or more captured images of said at least one user and repeating the steps (b) to (e) to obtain a unique signature matrix for said at least one user, (h) perform a comparison between said unique signature matrix with a set of unique signature matrices previously stored in said database, and (i) trigger at least one action based on said comparison.

11. The system of claim 10, wherein said one or more selection parameters comprises at least one of intensity, brightness and blur pertaining to said one or more captured images.

12. The system of claim 10, wherein said extracted image comprises at least a portion depicting an anterior upper and a lower set of teeth.

13. The system of claim 10, wherein said set of patterns drawn on said grayscale image comprises region of interest from at least one of an upper left incisor, an upper right incisor, a lower left incisor, and a lower right incisor.

14. The system of claim 10, wherein said unique signature matrix for each person is generated from said grayscale image using applying zigzag Discrete Cosine Transform technique.

15. The system of claim 10, said comparison comprises processing of said unique signature matrix of each of said one or more users using at least one of one or more weak classifiers and a meta technique to indicate whether said unique signature matrix matches at least one corresponding unique signature matrix previously stored in said database to confirm an authentication of said at least one user.

16. The system of claim 10, wherein the step of trigger at least one action based on said comparison comprises denying authentication when (i) said unique signature matrix does not match with at least one of said unique signature matrices previously stored in said database, and (ii) said user keyword users does not match with at least one user keyword previously stored in said database.

17. The system of claim 10, wherein the step of trigger at least one action based on said comparison comprises performing another action when said unique signature matrix does not match with at least one unique signature matrix from said set of unique signature matrices previously stored in said database, and (ii) said user keyword matches with at least one user keyword previously stored in said database.

18. The system of claim 17, wherein said another action comprises:
retrieving an image from said database based on said user keyword and said pattern indicator in said database and generating a pattern vector for said image,
performing a comparison between said pattern vector of said one or more users and one or more pattern vectors previously stored in said database, and
authenticating said at least one user when said comparison yields a match greater than a predefined threshold value.

19. One or more non-transitory machine readable information storage mediums comprising one or more instructions which when executed by one or more hardware processors causes:
(a) capturing, by a hardware processor, a user name, a user keyword and one or more images of a set of teeth of each of one or more users using an image capturing device, to obtain one or more captured images;
(b) obtaining, by said hardware processor, a selected image from said one or more captured images of said one or more users, based on one or more selection parameters being applied to said one or more captured images;
(c) extracting, by said hardware processor, a portion of said selected image of said one or more users to obtain an extracted image of each of said one or more users;
(d) converting, by said hardware processor, said extracted image into a grayscale image and storing said grayscale image in a database along with said username and said user keyword of each of said one or more users;
(e) generating, by said hardware processor, a unique signature matrix from said grayscale image and storing said unique signature matrix in said database along with said username of each of said one or more users;
(f) generating, by said hardware processor, a pattern vector for each of said one or more users by combining a set of alphanumeric characters, said user keyword of each of said one or more users, and a pattern indicator to refer to one of a set of patterns which has been selected for said grayscale image and storing said pattern vector in said database along with said username of each of said one or more users;
(g) obtaining, by a said hardware processor, one or more images comprising a set of teeth of at least one user using an image capturing device, to obtain one or more captured images of said at least one user and repeating the steps (b) to (e) to obtain a unique signature matrix for said at least one user;
(h) performing a comparison between said unique signature matrix with a set of unique signature matrices previously stored in said database; and
(i) triggering at least one action based on said comparison.

20. The one or more non-transitory machine readable information storage mediums of claim 19, wherein the step of triggering at least one action based on said comparison comprises performing another action when said unique signature matrix does not match with at least one unique signature matrix from said set of unique signature matrices previously stored in said database, and (ii) said user keyword matches with at least one user keyword previously stored in said database, and
wherein said another action comprises:
retrieving an image from said database based on said user keyword and said pattern indicator in said database and generating a pattern vector for said image,
performing a comparison between said pattern vector of said one or more users and one or more pattern vectors previously stored in said database, and
authenticating said at least one user when said comparison yields a match greater than a predefined threshold value.

\* \* \* \* \*